United States Patent
Courtay et al.

(10) Patent No.: US 8,711,726 B2
(45) Date of Patent: Apr. 29, 2014

(54) METHOD AND DEVICE FOR RELIABLE ESTIMATION OF NETWORK TRAFFIC

(75) Inventors: Olivier Courtay, Rennes (FR); Olivier Heen, Domloup (FR)

(73) Assignee: Thomson Licensing, Issy les Moulineaux (FR)

( * ) Notice: Subject to any disclaimer, the term of this patent is extended or adjusted under 35 U.S.C. 154(b) by 93 days.

(21) Appl. No.: 13/557,930

(22) Filed: Jul. 25, 2012

(65) Prior Publication Data

US 2013/0034002 A1    Feb. 7, 2013

(30) Foreign Application Priority Data

Aug. 3, 2011    (EP) .................................... 11306010

(51) Int. Cl.
*G01R 31/08* (2006.01)
*H04W 24/00* (2009.01)
*H04L 12/66* (2006.01)

(52) U.S. Cl.
CPC .............. *H04W 24/00* (2013.01); *H04L 12/66* (2013.01)
USPC ............ 370/252; 370/468; 370/401; 370/230

(58) Field of Classification Search
None
See application file for complete search history.

(56) References Cited

U.S. PATENT DOCUMENTS

| | | | |
|---|---|---|---|
| 6,687,224 B1 | 2/2004 | Ater et al. | |
| 8,195,815 B2 * | 6/2012 | Woodman | 709/229 |
| 2007/0016688 A1 * | 1/2007 | Hester et al. | 709/238 |
| 2010/0150004 A1 * | 6/2010 | Duffield et al. | 370/252 |
| 2010/0188986 A1 * | 7/2010 | Csaszar et al. | 370/252 |

OTHER PUBLICATIONS

R. Poortinga et al. Analyzing campus traffic using the meter-MIB, Proceedings of Passive and Active Measurement workshop (PAM2002) XP55008674, Fort Collins, Colorado.
European Search Report dated Oct. 13, 2011.

* cited by examiner

*Primary Examiner* — Duc C Ho
(74) *Attorney, Agent, or Firm* — Robert D. Shedd; Patricia A. Verlangieri

(57) ABSTRACT

A network, advantageously a home network, comprises a number of user devices, for example personal computers, game consoles and smartphones, each having an estimator application, preferably voluntarily installed by the user. The network further comprises a network device that acts as an interface between the network and an external network. The estimator applications measure the network traffic for its user device, while the network device in parallel generates an independent measurement of the network consumption. The measurements are then compared. If the difference between the sum of the measurements from the estimator applications and the measurement of the network device is below a fixed threshold, it is assumed that the measurements are valid for the considered measurement time interval. Otherwise, the difference is an indication that at least one estimation was incorrect.

12 Claims, 1 Drawing Sheet

METHOD AND DEVICE FOR RELIABLE ESTIMATION OF NETWORK TRAFFIC

This application claims the benefit, under 35 U.S.C. §119 of EP Patent Application 11306010.7, filed 3 Aug. 2011.

TECHNICAL FIELD

The present invention relates generally to computer networks and in particular to the measurement of Internet traffic.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

There are situations where both a user of a home network and the user's Internet Service Provider (ISP) want to agree on the estimation of the network traffic, i.e. the data consumed by the user. Such situations encompass, but are not restricted to, proof of fair network use and verification of the consumption in a pay-per-use model.

According to a prior art solution, the ISP first by its own means logs the network traffic generated by each user and then analyzes and consolidates logs to obtain an estimation. This solution works reasonably well, but it has a number drawbacks: i) the price to provide a precise estimation is high; and ii) the user may refute the estimation, especially if it is not precise.

A more recent solution comes from the domain of anti-piracy of copyrighted content. The user voluntarily installs "spy" software on each networked device. The installed software controls the download behaviour of the device, for example through the use of a white list of authorized content, a white list of authorized web sites, a white list of authorized protocols, black lists or any other suitable technical means. The installed software also performs a local estimation of the device's network consumption. As the estimation is local, it has good chances of being precise and relatively cheap, particularly for the ISP as it uses resources on the user side. Whenever the user wants to prove the network consumption, the sum of the estimations of all pieces of installed software is sent to the ISP or any other entity that wishes to verify the network traffic.

This solution has one major drawback: it can be easily attacked by confining the installed spy software to virtual machines that voluntary have a very low network activity, thus resulting in a low or even null local estimation of network traffic.

The skilled person will thus appreciate that network traffic control software is pertinent only if all the traffic in the network is analyzed. A problem is to gain assurance that all the traffic is analyzed.

A different system is described by R. Poortinga et al. in "Analysing Campus Traffic Using the Meter-MIB", Proceedings of the Passive and Active Measurements Workshop (PAM 2002), Fort Collins, Colo., USA. The document describes a network with user devices connected to switches and then, possibly, to an outside network. The switches measure the traffic for each user device in order to see how good a measure the switches came up with when it came to outgoing traffic. To this end, a meter PC was put on the outgoing line to measure the outgoing traffic only. As it turned out, there is very little relation between the two measurements, so no reliable estimation may be made.

It will thus be appreciated that there is a need for a cost efficient solution that can provide an estimation of the network consumption that overcomes the attack using virtual machines. The present invention provides such a solution.

SUMMARY OF INVENTION

In a first aspect, the invention is directed to a method of estimating traffic consumption during a period of time of a first network comprising an interface device connecting the first network to an external network and at least one user device having an application configured to measure traffic consumption of the user device during the period of time, wherein the measured traffic involves a device in the external network. A device obtains a sum of the measurements of the traffic consumption during the period of time for each user device; obtains a further measurement of traffic consumption during the period of time; and determines that the estimations are correct in case a difference between the sum and the further measurement is below a threshold value. The measurements of traffic consumption are of at least one of: traffic delivered to the user device and traffic delivered to the first network, respectively, and traffic sent from the user device and traffic sent from the first network, respectively.

In a first preferred embodiment, the interface device receives the measurements from each user device. It is advantageous that the interface device computes the sum. It is further advantageous that the interface device further receives a value indicating a local time from each user device.

In a second preferred embodiment it is determined: if the further measurement is bigger than the sum added to the threshold, that there exists an unfairness on the side of the first network (100); and if the sum is bigger that the further measurement added to the threshold, that at least one measurement is incorrect.

In a third preferred embodiment only the measurements of the user devices that are directly connected to the interface device are added to obtain the sum.

In a fourth preferred embodiment, the application does not measure traffic delivered to or coming from a virtual device running on the user device.

In a fifth preferred embodiment, upon reception of a trigger, the application responds with its measurement and resets the measurement.

In a second aspect, the invention is directed to an interface device for estimating traffic consumption during a period of time of a first network comprising at least one user device having an application configured to measure traffic consumption of the user device during the period of time. The interface device connects the first network to an external network, and the measured traffic involves a device in the external network. The device comprises a processor configured to: receive the measurements from each user device, compute a sum of the measurements of the traffic consumption during the period of time for each user device, obtain a further measurement of traffic consumption during the period of time; and determine that the estimations are correct in case a difference between the sum and the further measurement is below a threshold value. The measurements of traffic consumption are of at least one of: traffic delivered to the user device and traffic delivered to the first network, respectively, and traffic sent from the user device and traffic sent from the first network, respectively.

In a first preferred embodiment the processor is further configured to receive a value indicating a local time from each user device.

In a second preferred embodiment, the processor is further configured to determine: if the further measurement is bigger than the sum added to the threshold, that there exists an unfairness on the side of the first network; and if the sum is bigger that the further measurement added to the threshold, that at least one measurement is incorrect.

In a third preferred embodiment, the processor is further configured to add only the measurements of the user devices that are directly connected to the interface device to obtain the sum.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
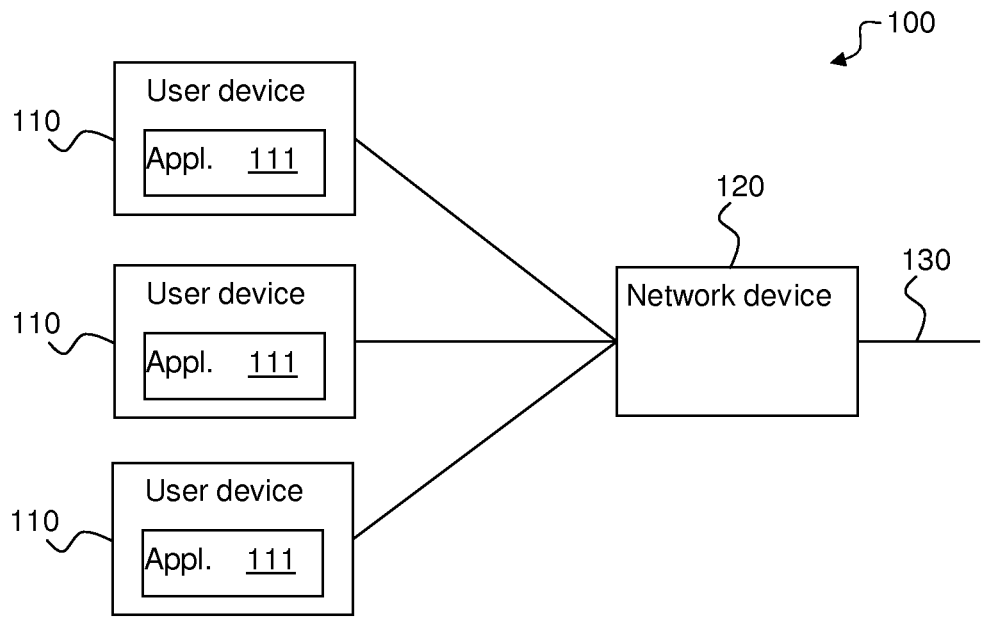
FIG. 1 illustrates a network in which the present invention may be used.

FIG. 1 illustrates a network 100 in which the present invention may be used. The network 100, advantageously a home network, comprises a number of user devices 110, for example personal computers, game consoles and smartphones. Each user device 110 has an estimator application 111, preferably voluntarily installed by the user. The network 100 further comprises a network device 120 to which the user devices 110 are connected and that further acts as an interface to the Internet (or some other network) through external network connection 130. In a preferred embodiment, the network device 120 is a gateway through which the home network is connected to the Internet via an ISP. Naturally, the user devices 110 and the network device 120 have the necessary hardware and software necessary for normal functioning, such as processors, memory, interfaces, operating systems and so on; the details are outside the scope of the present invention.

Figure 2:
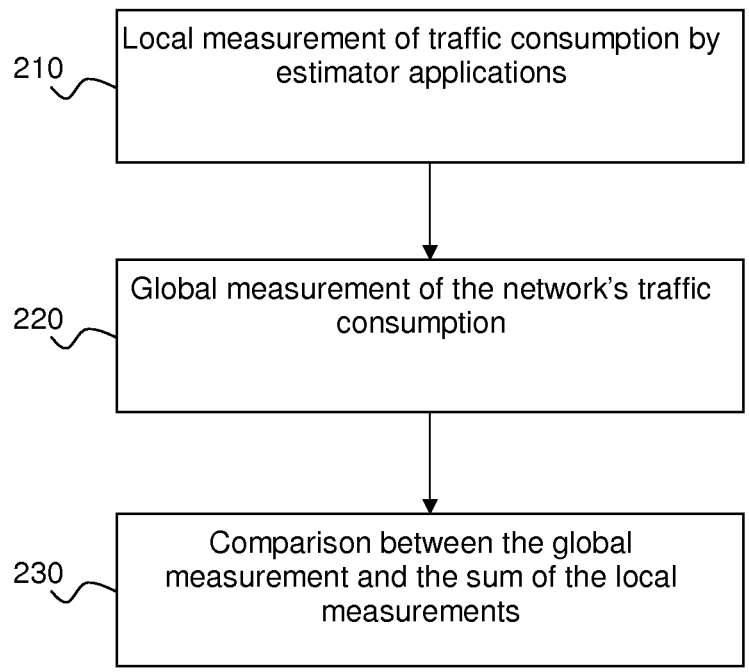
FIG. 2 illustrates a flow chart of a method of a preferred embodiment of the present invention.

A main inventive idea of the present invention, further described in FIG. 2, is for each estimator application 111 to monitor 210 the network traffic for its user device 110, while the network device 120 in parallel generates 220 an independent estimation of the network consumption and to compare 230 the estimations for a given period of time. If the difference between the sum of the estimations from the estimator applications and the estimation of the network device is below a fixed threshold, it is assumed that the estimation is valid for the considered measurement time interval. Otherwise, the difference is an indication that at least one estimation was incorrect.

It is possible to measure incoming network traffic, outgoing network traffic, or both incoming and outgoing network traffic, provided that the measurements of both sides are for the same thing.

It is preferred that the network device 120 is trusted by the ISP (or other provider). According to a preferred embodiment where the network is a home network, the network device 120 is a Digital Subscriber Line Access Multiplexer (DSLAM) or a home gateway running legacy software—advantageously provided by the provider such as an ISP. In alternative embodiments, the network device 120 is the last router before the site (the "n−1" router), the Base Station Controller (BSC) of a GSM transmission system or the like.

It is important for the estimator applications to consider only network traffic arriving from or sent to the outside of the network 100, i.e. through the external network connection 130; internal traffic should not be counted by any estimator application. This is advantageously achieved by only counting network traffic involving exactly one external network address.

There are several possible types of estimator applications, including but not limited to:

1) Monitoring applications: all the (external) traffic through the estimator is monitored. The authorized traffic and the total traffic through the estimator are accounted and memorized. In the nominal case, both values are the same.

2) Filtering applications: the estimator application blocks non-authorized traffic and only counts authorized (external) traffic.

It should be noted that it is possible to have a mix of different types of estimator applications in a single network.

Illustrative Embodiment

In the illustrative embodiment, the network 100 is an Internet Protocol home network connected to the Internet via a home gateway 120 and an Internet Service Provider (ISP).

First Step: Installation

The user of the home network installs estimator applications on every user device in the home network that meets the following conditions:

1) The user device is able to download/upload from the Internet through the home gateway.
2) The user device supports the installation of an estimator application.

The estimator applications being to count time and to estimate the devices' network consumption.

Second Step: Consolidation of Local Estimations

At specified times, e.g. every 24 hours, the estimator applications report the estimations to the home gateway. The home gateway sums up the values and, possibly, sends the result to the ISP together with an indication of the time period.

Third Step: Global Estimation

In parallel, the provider performs a continuous estimation of the network consumption of the home gateway. This estimation may be performed centrally or in the home gateway and may be as simple as counting the amount of traffic that passes through (e.g. the gateway). There is no need for a precise analysis of the network flows.

Fourth Step: Comparison and Reporting

When the ISP has the sum S from the estimator applications for a specific time period, it may:

1) calculate its own global estimation G for the corresponding time period, and
2) compare S and G.

For a defined threshold T (that in an ideal case is zero, but realistically is set to a positive value that may be expressed as a fixed value or a percentage of either the global estimation G or the sum S):

If $|S-G| \leq T$, the ISP can report a normal situation.

If $G > S+T$, the ISP can report possible unfairness on the home network side. In other words, it is possible that the user has cheated somehow.

If $S > G+T$, the ISP can report a possible estimation error. Potential causes of the error are: bad global estimation from the ISP, bad local estimation from one or more estimators, etc.

Appropriate action may be taken if necessary; the nature of the appropriate action is outside the scope of the present application, but examples of actions to take in case the user has cheated include sending a warning message to the user, sending a warning message to the ISP, and interrupting the user's network connection.

It should be noted that the comparison and reporting step may also be performed by the user, thus increasing the global confidence in the measurement system.

First Improvement

A potential attack against the system is an advanced variant of the "virtual machine" attack described in the background of the invention section.

Attack: The attacker tries to account more authorized traffic than the real overall traffic by making the estimators report much fake traffic. This may be done by connecting a physical device with an estimator application to the home gateway. The attacker further installs a virtual machine on the physical device and an estimator application on the virtual machine. The physical device thus acts as a network bridge from the home gateway to the virtual machine. The attacker then generates a quantity Q of network traffic from the virtual machine.

The effect of the attack is that the estimator application of the virtual machine reports an estimation of Q. The estimator application of the physical device also reports Q as its estimation. The home gateway sums up Q+Q and reports 2Q to the ISP. During the corresponding time period, the ISP correctly gives Q as its estimation. Thus, the unfair user can generate a further quantity Q of network traffic on a device that is connected to the home gateway but that does not have any estimator application installed.

A first countermeasure is to set the traffic estimations of every device that is not directly connected to the home gateway to zero. State of the art gateways are able to detect whether or not devices are directly connected, for instance by testing their MAC addresses.

The first countermeasure is however not sufficient in a more sophisticated setup where the virtual machine is directly connected to the gateway.

A second countermeasure is to enable an estimator application to differentiate between network traffic delivered to the physical device and network traffic delivered to the virtual machine. The estimator application then only counts the traffic delivered to the physical device. An estimator application implemented in the kernel of the operating system is able to discern between the two.

It will be appreciated that both countermeasures can be used simultaneously.

Second Improvement

An attacker may also play with the date and time on the user devices and the gateway in order to complicate the comparison of the estimated traffic values.

As a countermeasure, both the estimator applications and the gateway should send their local time values to the ISP for comparison. It should be noted that it is not necessary for the time values to be the same as long as the relative differences between them do not change above a predetermined (small) threshold between measurements.

Another possible countermeasure is to let the ISP trigger the verification. This countermeasure requires a channel from the ISP to each estimator. This channel is outside the scope of the present invention. Once the verification is triggered the estimators report their values and are reset to zero. This countermeasure does not depend on time.

It will thus be appreciated that the present invention can provide:

Estimations of the network traffic that are either agreed by both participants (the user and the provider) or clearly reported as unfair.

Increased reliability of the estimation as it is made up of data coming from two independent sources.

Cost efficiency for the provider: the provider uses only a global estimation, no traffic filtering nor in depth analysis is required.

Cost efficiency for the gateway: it does not perform traffic analysis.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of estimating traffic consumption during a period of time of a first network comprising an interface device connecting the first network to an external network and at least one user device having an application configured to measure traffic consumption of the at least one user device during the period of time, wherein the measured traffic involves a device in the external network, the method comprising the steps, in the device, of:
    obtaining a sum of the measurements of the traffic consumption during the period of time for the at least one user device;
    obtaining a global measurement of traffic consumption during the period of time; and
    determining that the estimations are correct in case a difference between the sum and the global measurement is below a threshold value;
    wherein the measurements of traffic consumption are of at least one of: traffic delivered to the at least one user device and traffic delivered to the first network, respectively, and traffic sent from the at least one user device and traffic sent from the first network, respectively.

2. The method of claim 1, further comprising the step of:
    receiving, by the interface device, the measurements from the at least one user device.

3. The method of claim 2, further comprising the step of computing, by the interface device the sum.

4. The method of claim 2, wherein the interface device further receives a value indicating a local time from the at least one user device.

5. The method of claim 1, wherein it is determined:
    if the global measurement is bigger than the sum added to the threshold, that there exists an unfairness on the side of the first network; and
    if the sum is bigger that the global measurement added to the threshold, that at least one measurement is incorrect.

6. The method of claim 1, wherein only the measurements of the at least one user devices that are directly connected to the interface device are added to obtain the sum.

7. The method of claim 1, wherein the application does not measure traffic delivered to or coming from a virtual device running on the at least one user device.

8. The method of claim 1, wherein, upon reception of a trigger, the application responds with its measurement and resets the measurement.

9. An interface device for estimating traffic consumption during a period of time of a first network comprising at least one user device having an application configured to measure traffic consumption of the at least one user device during the period of time, the interface device connecting the first network to an external network, wherein the measured traffic involves a device in the external network, the device comprising a processor configured to:

receive the measurements from the at least one user device;

compute a sum of the measurements of the traffic consumption during the period of time for the at least one user device;

obtain a global measurement of traffic consumption during the period of time; and determine that the estimations are correct in case a difference between the sum and the global measurement is below a threshold value;

wherein the measurements of traffic consumption are of at least one of: traffic delivered to the at least one user device and traffic delivered to the first network, respectively, and traffic sent from the at least one user device and traffic sent from the first network, respectively.

10. The interface device of claim 9, wherein the processor is further configured to receive a value indicating a local time from each user device.

11. The interface device of claim 9, wherein the processor is further configured to determine:

if the global measurement is bigger than the sum added to the threshold, that there exists an unfairness on the side of the first network; and if the sum is bigger that the global measurement added to the threshold, that at least one measurement is incorrect.

12. The interface device of claim 9, wherein the processor is further configured to add only the measurements of the at least one user devices that are directly connected to the interface device to obtain the sum.

* * * * *